(12) United States Patent
Miyamori

(10) Patent No.: US 10,589,792 B2
(45) Date of Patent: Mar. 17, 2020

(54) THREE-WHEELED VEHICLE

(71) Applicant: Shigeki Miyamori, Shizuoka (JP)

(72) Inventor: Shigeki Miyamori, Shizuoka (JP)

(*) Notice: Subject to any disclaimer, the term of this patent is extended or adjusted under 35 U.S.C. 154(b) by 162 days.

(21) Appl. No.: 15/612,101

(22) Filed: Jun. 2, 2017

(65) Prior Publication Data

US 2018/0037265 A1 Feb. 8, 2018

(30) Foreign Application Priority Data

Aug. 2, 2016 (JP) ................. 2016-151987

(51) Int. Cl.
| | |
|---|---|
| *B62D 24/04* | (2006.01) |
| *B62D 61/06* | (2006.01) |
| *B60G 1/02* | (2006.01) |
| *B60K 5/04* | (2006.01) |
| *B62D 21/11* | (2006.01) |
| *B60K 5/00* | (2006.01) |

(52) U.S. Cl.
CPC ............... *B62D 24/04* (2013.01); *B60G 1/02* (2013.01); *B60K 5/04* (2013.01); *B62D 21/11* (2013.01); *B62D 61/065* (2013.01); *B60G 2200/44* (2013.01); *B60G 2202/312* (2013.01); *B60G 2300/122* (2013.01); *B60K 2005/003* (2013.01)

(58) Field of Classification Search
CPC ...... B62D 24/04; B62D 61/06; B62D 61/065; B62D 21/11; B60G 1/02
See application file for complete search history.

(56) References Cited

U.S. PATENT DOCUMENTS

| 8,973,930 B2* | 3/2015 | Rhodig ................. B60G 21/00 |
|---|---|---|
| | | 280/124.103 |
| 2005/0208262 A1* | 9/2005 | Nordhoff ............. A01B 59/068 |
| | | 428/100 |

(Continued)

FOREIGN PATENT DOCUMENTS

| JP | 07-033060 | 2/1995 |
|---|---|---|
| JP | 09-086448 A | 3/1997 |

(Continued)

OTHER PUBLICATIONS

Hirahara et al., Vehicle Steering Device, Apr. 22, 2004, JPO, JP 2004-123080 A, English Abstract (Year: 2004).*

(Continued)

*Primary Examiner* — James A English
(74) *Attorney, Agent, or Firm* — Tucker Ellis LLP

(57) ABSTRACT

There is provided a three-wheeled vehicle that can maintain the ground contact surfaces of wheels and the road surface in contact with each other at all times, and that can suppress direct transmission of most of an impact from the road surface to a platform. First to third wheels are attached to a body frame that is rigid. The platform and the body frame are connected to each other by a connecting structure. First to third three degree of freedom non-restricted connecting mechanisms and first to third three degree of freedom restricted connecting mechanisms that form the connecting structure are deformed to allow the platform to make a bouncing motion, a rolling motion, a pitching motion, and a combined motion thereof within a restricted range when an impact is applied to the body frame from the road surface.

13 Claims, 11 Drawing Sheets

(56) References Cited

U.S. PATENT DOCUMENTS

2006/0071440 A1* 4/2006 Fought .................. B62K 3/002
                                                280/124.128
2017/0088214 A1* 3/2017 Ohno ..................... B62D 7/16
2017/0334488 A1* 11/2017 Takata .................. B62D 27/04

FOREIGN PATENT DOCUMENTS

| JP | 09086448 A | * | 3/1997 |
| JP | 2004123080 A | * | 4/2004 |
| JP | 2004123080 A | | 4/2004 |

OTHER PUBLICATIONS

Hirahara et al., Vehicle Steering Device, Apr. 22, 2004, JPO, JP 2004-123080 A, Machine Translation of Description (Year: 2004).*
Tsutomu Sonehara, Attitude Control Device for Cab, Mar. 31, 1997, JPO, JP 09-86448 A, Machine Translation of Specification (Year: 1997).*
J. Alderson and D. Rushton, "Morgan Sweeps the Board the Three-Wheeler Story", Gentry Books Limited (1978), published Feb. 25, 1971.
R.M. Clarke, "Morgan Three-Wheelers Ultimate Portfolio 1909-1952", Brooklands Books, Ltd. (2009), 5 pages.

* cited by examiner

THREE-WHEELED VEHICLE

RELATED APPLICATION DATA

This application claims priority to Japanese Patent Application No. 2016-151987, filed Aug. 2, 2016, the disclosure of which is incorporated herein by reference in its entirety.

TECHNICAL FIELD

The present invention relates to a three-wheeled vehicle that includes a power source.

BACKGROUND ART

As described in JP 7-33060 A, in a three-wheeled vehicle (a vehicle in which a front wheel or a rear wheel is considered as one wheel) according to the related art, a platform on which a driver rides is fixed to a body frame. When such a three-wheeled vehicle goes around a curve at a high speed, a centrifugal force acts to significantly tilt the "one wheel". This phenomenon is caused for all the three-wheeled vehicles according to the related art that are commercially available (see J. Alderson and D. Rushton "MORGAN Sweeps the Board The Three-wheeler Story", 1978, published by Gentry Books Limited, 16 Regency Street, London SW1 and "MORGAN Three-Wheelers Ultimate Portfolio 1909-1952", published by Brooklands Books Ltd. P.O. Box 146, Cobham, Surrey, KT11 1LG. UK).

In contrast, in heavy trucks with suspensions in which the left and right wheels share an axle (so-called rigid-axle suspensions or De Dion-axle suspensions), the left and right wheels are not inclined even if the vehicle body is tilted.

JP 2004-123080 A describes a three-wheeler in which a body frame having wheels thereon and a platform (a structure to which a seat is mounted) on which a driver rides are integrated with each other. A connecting structure configured to connect the platform and the body frame to each other as described in JP 2004-123080 A is a rigid connecting structure. During cornering, the three-wheeler according to JP 2004-123080 A utilizes positive camber thrust (camber thrust obtained by tilting tires on the two rear wheels) obtained by rolling in the direction opposite to operation of common four-wheelers and three-wheelers.

JP 9-86448 A describes a connecting structure in which six hydraulic actuators are disposed between a vehicle frame and a cab and the six hydraulic actuators are driven to improve vibration characteristics with six degrees of freedom. In the connecting structure described in JP 9-86448 A, the six hydraulic actuators are controlled based on complicated computation to improve the vibration characteristics of a rolling motion, a pitching motion, a bouncing motion, a longitudinal motion, a lateral motion, and a yawing motion of the platform.

SUMMARY OF INVENTION

If rigid-axle suspensions are used for a body frame of a three-wheeled vehicle, the ground camber angle of the wheels can be made substantially zero, and therefore contact between the ground contact surfaces of the wheels and the road surface can be maintained at all times, even at a curve. With this configuration, however, an impact from the road surface applied to the body frame is also directly transmitted to the platform although the ground contact surfaces of the wheels and the road surface can be maintained in contact with each other at all times. This significantly deteriorates the riding comfort.

It is an object of the present invention to provide a three-wheeled vehicle that can maintain the ground contact surfaces of wheels and the road surface in contact with each other at all times, and that can suppress direct transmission of most of an impact from the road surface to a platform.

A three-wheeled vehicle of the present invention includes a body frame, first, second, and third wheels, a platform, a power source, and a steering mechanism. The body frame is rigid, and has a first end and a second end. The first and second wheels are provided on both sides of the first end of the body frame. The third wheel is provided at the second end of the body frame. A driver rides on the platform. The power source is configured to provide power to the first and second wheels or the third wheel. The steering mechanism is configured to steer the first and second wheels or the third wheel. In the present invention, a connecting structure is configured to connect the platform and the body frame to each other. The connecting structure is configured to allow the platform to make a bouncing motion, a rolling motion, a pitching motion, and a combined motion of such motions with respect to the body frame within a restricted range, but to restrict other motions, in order to suppress transmission of an impact force, which has been transmitted from a road surface to the body frame, to the platform. Herein, the term "bouncing motion" means a motion in which the platform is displaced in the vertical direction with respect to the body frame. The term "rolling motion" means a motion in which the platform swings about a frame centerline of the body frame that is orthogonal to the vertical direction and that connects between one end and the other end of the body frame. The term "pitching motion" means a motion in which the platform swings with respect to the body frame about a horizontal centerline that is orthogonal to the frame centerline and the vertical direction. The term "combined motion of such motions" means a motion in which two or more of the bouncing motion, the rolling motion, and the pitching motion are concurrently caused. The term "other motions" means a rotating motion (yawing motion) about a Z-axis direction, a translational motion in an X-axis direction, and a translational motion in a Y-axis direction when the axis about which the rolling motion is made is defined as an X axis, the axis about which the pitching motion is made is defined as a Y axis, and the axis that is orthogonal to the X axis and the Y axis is defined as a Z axis. When the three-wheeled vehicle is driven, the combined motion is most frequently caused.

According to the present invention, a so-called rigid-axle system is used for the body frame which is rigid. Thus, the ground contact surfaces of wheels and the road surface can be maintained in contact with each other at all times. The connecting structure discussed earlier allows the platform to make a bouncing motion, a rolling motion, a pitching motion, and a combined motion of such motions with respect to the body frame within a restricted range, in order to suppress transmission of an impact force, which has been transmitted from a road surface to the body frame, to the platform. Thus, most of the impact which has been transmitted from the road surface to the body frame can be absorbed by the connecting structure. As a result, according to the present invention, the riding comfort felt by the driver is not significantly deteriorated.

The connecting structure may comprise three or more three degree of freedom non-restricted connecting mechanisms and two or more three degree of freedom restricted connecting mechanisms. The three or more three degree of freedom non-restricted connecting mechanisms are disposed between the platform and the body frame and around the platform with a clearance from the platform. The three degree of freedom non-restricted connecting mechanisms are configured to support the platform with respect to the body frame and to allow the platform to make the bouncing motion, the rolling motion, the pitching motion, and the combined motion of such motions with respect to the body frame within the restricted range. The two or more three degree of freedom restricted connecting mechanisms are disposed between the platform and the body frame. The three degree of freedom restricted connecting mechanisms are configured to allow the platform to make the bouncing motion, the rolling motion, the pitching motion, and the combined motion of such motions with respect to the body frame, but to restrict the platform making two translational motions other than yawing motion and the bouncing motion with respect to the body frame. If the connecting structure is formed from the three degree of freedom non-restricted connecting mechanisms and the three degree of freedom restricted connecting mechanisms, the connecting structure can be easily formed.

The present invention is applicable to both a case where the first and second wheels serve as front wheels and the third wheel serves as a rear wheel and a case where the first and second wheels serve as rear wheels and the third wheel serves as a front wheel. The rear wheel may be composed of one wheel or double wheels having a common axle. The double wheels are disposed proximate to each other enough to be considered to function as a single wheel. In the present invention, the rear wheel may be driving wheels driven by the power source, or may not be driving wheels.

The number of the three degree of freedom non-restricted connecting mechanism may be three or more. The specific structure of the three degree of freedom non-restricted connecting mechanism may be determined as desired. For example, the three degree of freedom non-restricted connecting structure may include a positioning rod and a support mechanism. A first end of the positioning rod is connected to the platform via a spherical bearing or an elastic bushing. The support mechanism is connected to a second end of the positioning rod via a spherical bearing or an elastic bushing, and attached to the body frame to allow the positioning rod to make a motion in a vertical direction. The thus structured three degree of freedom non-restricted connecting mechanisms are easily assembled, and have a simple structure.

The number and the specific structure of the three degree of freedom restricted connecting mechanisms may also be determined as desired. For example, the three degree of freedom restricted connecting mechanisms may include three position restricting rods. A first end of each of the three degree of freedom restricted connecting mechanisms is connected to the platform via a spherical bearing or an elastic bushing. A second end of each of the three degree of freedom restricted connecting mechanisms is attached to the body frame via a spherical bearing or an elastic bushing. One of the position restricting rods extends in parallel with a centerline of the pitching motion in a stationary state, and the first end of the one position restricting rod is located on a centerline of the rolling motion. The two remaining position restricting rods are located on both sides of the centerline of the rolling motion, and two centerlines of the two position restricting rods intersect each other at an imaginary point on the centerline of the rolling motion in the stationary state. The thus structured three degree of freedom restricted connecting mechanisms are easily assembled, and have a simple structure.

The three degree of freedom non-restricted connecting mechanism may include a shock absorber. A first end of the shock absorber is connected to the platform via a spherical bearing or an elastic bushing. A second end of the shock absorber is connected to the body frame via a spherical bearing or an elastic bushing. In this case, assume an axis around which the rolling motion is made is defined as an X axis, an axis around which the pitching motion is made is defined as a Y axis, and an axis that is orthogonal to the X axis and the Y axis is defined as a Z axis. The two or more three degree of freedom restricted connecting mechanisms may include a first three degree of freedom restricted connecting mechanism located on one side in an axial direction of the X axis and a second three degree of freedom restricted connecting mechanism located on the other side in the axial direction of the X axis. Preferably, the first three degree of freedom restricted connecting mechanism is restricted from moving in an axial direction of the Y axis. The second three degree of freedom restricted connecting mechanism is restricted from moving in the axial direction of the X axis and the axial direction of the Y axis. Adopting such a configuration provides the three degree of freedom non-restricted connecting mechanisms and the three degree of freedom restricted connecting mechanisms with a simple structure.

The body frame may include a center frame, a first frame, and a second frame. The center frame extends along a frame centerline that works as the center of the rolling motion. The first frame is connected to one end of the center frame, and constitutes the one end. The second frame is connected to the other end of the center frame, and constitutes the other end. In this case, the platform may include a bottom plate and a cover portion. The bottom plate is positioned below the center frame. The cover portion is connected to the bottom plate, and positioned above the center frame on the side of the first frame. In this case, the three or more three degree of freedom non-restricted connecting mechanisms may include a first three degree of freedom non-restricted connecting mechanism and a second three degree of freedom non-restricted connecting mechanism that are disposed between the cover portion and both ends of the first frame, and a third three degree of freedom non-restricted connecting mechanism that is disposed between the center frame and the bottom plate. The two or more three degree of freedom restricted connecting mechanisms may include a first three degree of freedom restricted connecting mechanism that is disposed between the first frame of the body frame and the bottom plate of the platform, and a second three degree of freedom restricted connecting mechanism and a third three degree of freedom restricted connecting mechanism that are disposed between the second frame of the body frame and the bottom plate.

DESCRIPTION OF EMBODIMENTS

Three-wheeled vehicles according to embodiments of the present invention will be described below with reference to the accompanying drawings.

First Embodiment

Figure 1:
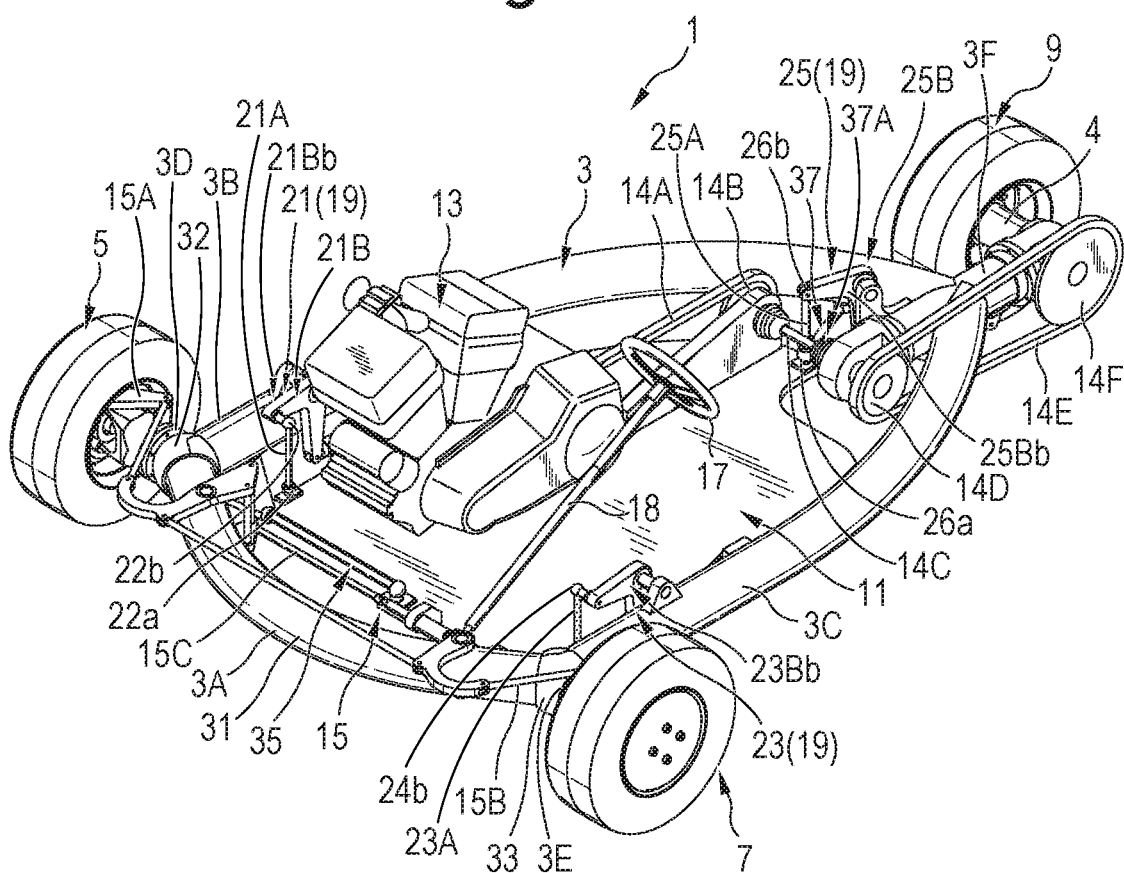
FIG. 1 is a schematic perspective view of a three-wheeled vehicle according to a first embodiment of the present invention.
Figure 2:
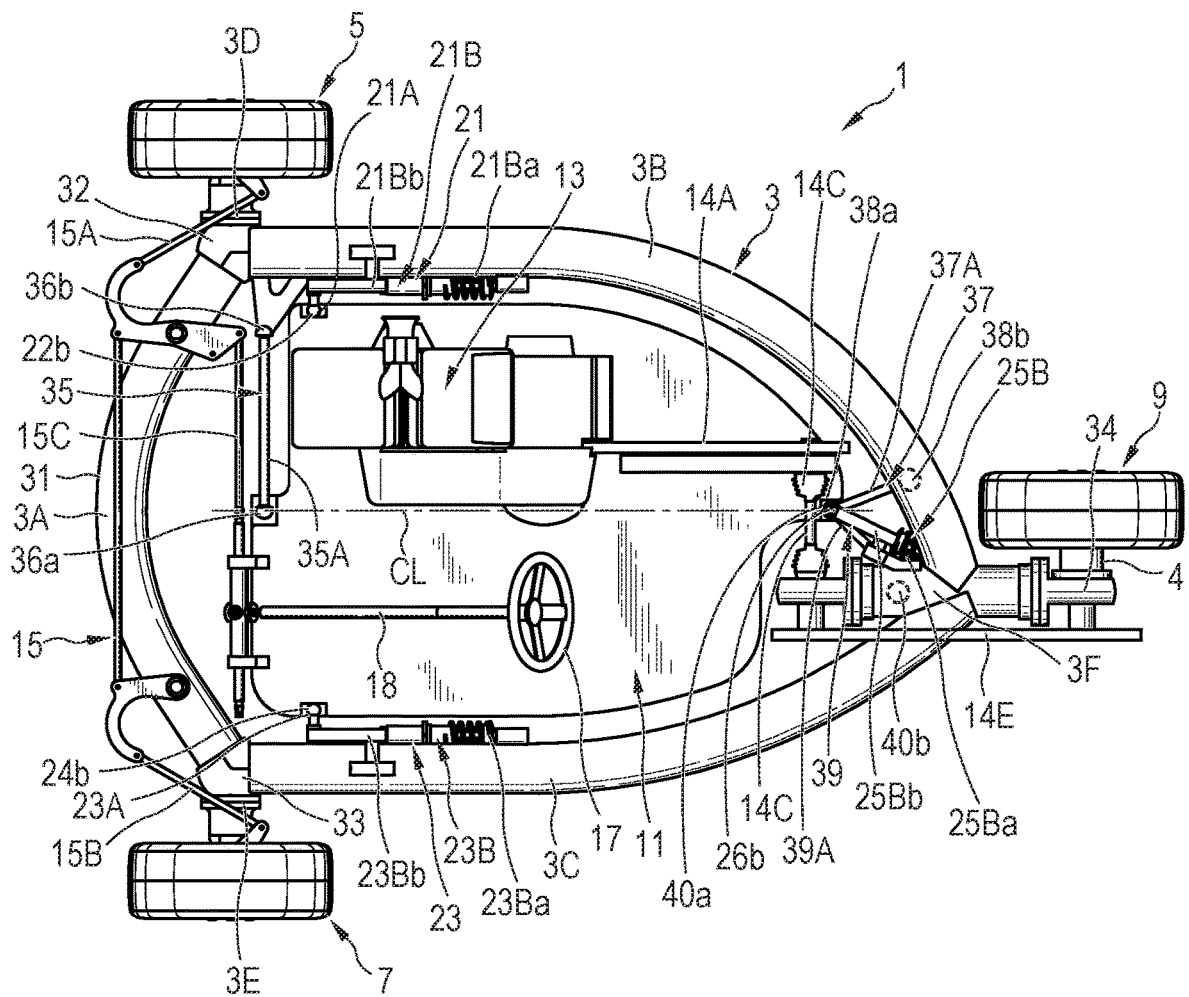
FIG. 2 is a schematic plan view of the three-wheeled vehicle according to the first embodiment of the present invention.
Figure 3:
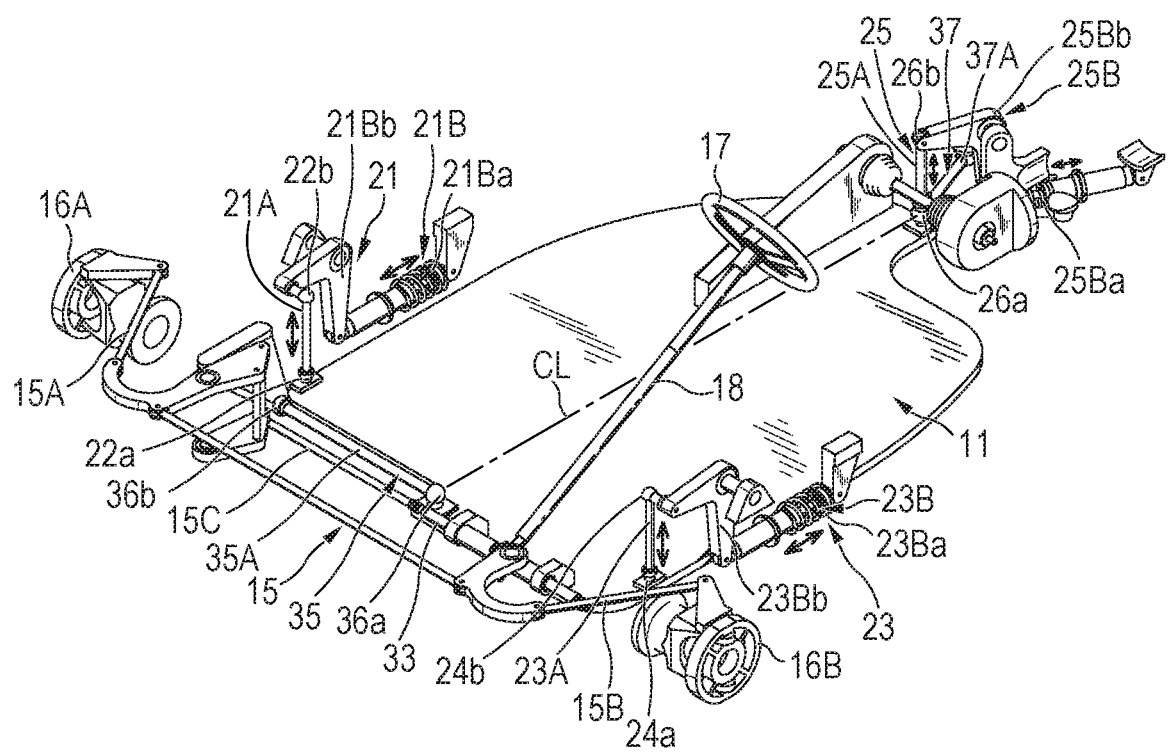
FIG. 3 is a perspective view of an embodiment from which some of components such as a body frame, wheels, etc. are omitted in order to describe the configuration of a connecting structure.

FIGS. 1 and 2 are a schematic perspective view and a schematic plan view, respectively, of a three-wheeled vehicle according to an embodiment of the present invention. In FIGS. 1 and 2, some of components such as a driver's seat and a body are omitted. FIG. 3 is a perspective view of the three-wheeled vehicle from which some of components such as a body frame, wheels, etc. are omitted in order to describe the configuration of a connecting structure which will be discussed later.

A three-wheeled vehicle 1 illustrated in FIGS. 1 to 3 has a body frame 3 that is rigid and that has a first end and a second end. The body frame 3 is formed from metal such as iron or aluminum, carbon fibers, or the like. The body frame 3 according to the embodiment includes three curved pipes 3A to 3C and three straight pipes 3D to 3F. The body frame 3 forms a main portion of so-called rigid-axle suspensions. On both sides 32 and 33 of one end 31 of the body frame 3, a first wheel 5 and a second wheel 7 are attached to knuckles 16A and 16B (FIG. 3) provided on the straight pipes 3D and 3E to be steered via link mechanisms 15A and 15B of a steering mechanism 15 which will be discussed later. A third wheel 9 is attached to an axle 4 provided at the other end 34 of the body frame 3.

A platform 11 on which a driver rides is connected to the body frame 3 via a connecting structure 19 which will be discussed later. A power source 13 constituted of an internal combustion engine that provides power to the third wheel 9 is mounted on the platform 11. In the embodiment, power from the power source 13 is transferred to a pulley 14B through a belt 14A. Rotation of the pulley 14B is transferred to a pulley 14D via a movable transfer shaft 14C. Both ends of the movable transfer shaft 14C are pivotable. Rotation of the pulley 14D is transferred to a pulley 14F via a belt 14E. Rotation of the pulley 14F is directly transferred to the axle 4.

A steering rod 15C that forms a part of the steering mechanism 15 is fixed to the platform 11 to be linearly movable. A handle is mounted to a drive portion of the steering rod 15C via a rack-and-pinion device and an operation shaft 18. In the embodiment, the first wheel 5 and the second wheel 7 are steered by the steering mechanism 15. As a matter of course, however, the third wheel 9 may be steered by the steering mechanism 15.

The platform 11 and the body frame 3 are connected to each other by the connecting structure 19. The connecting structure 19 includes a first three degree of freedom non-restricted connecting mechanism 21, a second three degree of freedom non-restricted connecting mechanism 23, a third three degree of freedom non-restricted connecting mechanism 25, a first three degree of freedom restricted connecting mechanism 35, a second three degree of freedom restricted connecting mechanism 37 and a third three degree of freedom restricted connecting mechanism 39. The first three degree of freedom non-restricted connecting mechanism 21 and the second three degree of freedom non-restricted connecting mechanism 23 are disposed between both sides 32 and 33 of one end 31 of the body frame 3 and the platform 11, respectively. The third three degree of freedom non-restricted connecting mechanism 25 is disposed between the other end 34 of the body frame 3 and the platform 11. The first three degree of freedom restricted connecting mechanism 35 is disposed between the body frame 3 and the platform 11. The second three degree of freedom restricted connecting mechanism 37 and the third three degree of freedom restricted connecting mechanism 39 (FIG. 2) are disposed between the other end 34 of the body frame 3 and the platform 11.

As illustrated in FIG. 2, the first to third three degree of freedom restricted connecting mechanisms 35 to 39 include position restricting rods 35A, 37A, and 39A, respectively. Respective first ends of the position restricting rods 35A, 37A, and 39A are connected to the platform 11 via spherical bearings 36a, 38a, and 40a. Respective second ends of the position restricting rods 35A, 37A, and 39A are attached to the body frame 3 via spherical bearings 36b, 38b, and 40b. The position restricting rod 35A extends in parallel with the centerline of the pitching motion in a stationary state. The first end of the position restricting rod 35A is located on a centerline CL (FIGS. 2 and 3) of the rolling motion. The two remaining position restricting rods 37A and 39A are located on both sides of the centerline CL of the rolling motion. Two centerlines of the two position restricting rods 37A and 39A intersect each other at an imaginary point on the centerline CL of the rolling motion in the stationary state.

The point of connection between the steering rod 15C of the steering mechanism 15 and the operation shaft 18, which is operated using the handle 17, is located on the extension of the steering rod 15C. In the embodiment, the steering mechanism 15 is configured such that the steering rod 15C of the steering mechanism 15 and the position restricting rod 35A extend in parallel with each other. The first to third three degree of freedom restricted connecting mechanisms 35 to 39 are disposed between the platform 11 and the body frame 3. The first to third three degree of freedom restricted connecting mechanisms 35 to 39 are disposed to allow the platform 11 to make a bouncing motion, a rolling motion, a pitching motion, and a combined motion of such motions with respect to the body frame 3, but to restrict the platform 11 making two translational motions other than yawing motion and the bouncing motion with respect to the body frame 3.

The first to third three degree of freedom non-restricted connecting mechanisms 21 to 25 are structured to be deformed to allow the platform 11 to make the bouncing motion, the rolling motion, the pitching motion, and the combined motion within a restricted range when an impact is applied to the body frame 3 from the road surface.

As illustrated in FIG. 3, the first to third three degree of freedom non-restricted connecting mechanisms 21 to 25 include positioning rods 21A to 25A and support mechanisms 21B to 25B, respectively. First ends of the positioning rods 21A to 25A are connected to the platform 11 via spherical bearings 22a, 24a, and 26a, respectively, which are ball joints. Second ends of the positioning rods 21A to 25A are connected to the support mechanisms 21B to 25B via spherical bearings 22b, 24b, and 26b, respectively, which are ball joints. The support mechanism 21B of the first three degree of freedom non-restricted connecting mechanism 21, the support mechanism 23B of the second three degree of freedom non-restricted connecting mechanism 23, and the support mechanism 25B of the third three degree of freedom non-restricted connecting mechanism 25 allow the positioning rods 21A, 23A, and 25A, respectively, to be moved in the vertical direction. Specifically, the support mechanism 21B of the first three degree of freedom non-restricted connecting mechanism 21, the support mechanism 23B of the second three degree of freedom non-restricted connecting mechanism 23, and the support mechanism 25B of the third three degree of freedom non-restricted connecting mechanism 25 include spring members 21Ba to 25Ba and link mechanisms 21Bb to 25Bb, respectively. The spring members 21Ba to 25Ba store energy when a force that moves the positioning rods 21A, 23A, and 25A downward with respect to the body frame 3 is applied, and release energy when the force is released. The link mechanisms 21Bb to 25Bb are connected to the positioning rods 21A, 23A, and 25A to enable the spring members 21Ba to 25Ba to store and release energy.

The link mechanisms 21Bb to 25Bb of the support mechanisms 21B to 25B are structured to enable the platform 11 to make a bouncing motion, a rolling motion, a pitching motion, and a combined motion of such motions with respect to the body frame 3 within a restricted range, in order to suppress transmission of an impact force, which has been transmitted from the road surface to the body frame 3, to the platform 11 when an impact is applied to the body frame, by allowing displacement of the positioning rods 21A, 23A, and 25A utilizing energy storage and energy release of the spring members 21Ba to 25Ba.

Specifically, when the amounts of displacement of the positioning rods 21A to 25A of the first to third three degree of freedom non-restricted connecting mechanisms 21 to 25 are the same as each other, the platform 11 makes a bouncing motion. When the amounts of displacement of the positioning rod 21A of the first three degree of freedom non-restricted connecting mechanism 21 and the positioning rod 23A of the second three degree of freedom non-restricted connecting mechanism 23 are different from each other, the platform 11 makes a rolling motion. When the amounts of displacement of the positioning rods 21A and 23A of the first and second three degree of freedom non-restricted connecting mechanisms 21 and 23 and the amount of displacement of the positioning rod 25A of the third three degree of freedom non-restricted connecting mechanism 25 are different from each other, the platform 11 makes a pitching motion. When the amounts of displacement of the positioning rods 21A, 23A, and 25A of the first to third three degree of freedom non-restricted connecting mechanisms 21 to 25 are different from each other, the platform 11 makes a combined motion.

The first three degree of freedom non-restricted connecting mechanism 21 is taken as an example. When the three-wheeled vehicle is traveling on a flat land, the weight of the platform 11 acts on the positioning rod 21A as a force in the direction of displacing the spherical bearing 22a downward. As a result, the link mechanism 21Bb causes the spring member 21Ba to store energy. At this time, if a force directed upward as seen from the road surface is applied to the body frame 3 by an impact from the road surface, the positioning rod 21A is moved downward with respect to the body frame 3 to cause the spring member 21Ba to further store energy. If a force directed downward as seen from the road surface is applied to the body frame 3 by a dent of the road surface, the positioning rod 21A is moved upward with respect to the body frame 3 to cause the spring member 21Ba to release energy. The positioning rods 21A to 25A of the first to third three degree of freedom non-restricted connecting mechanisms 21 to 25 are moved up and down as appropriate by a force that acts on the body frame and the platform 11 because of an impact from the road surface and the inertial force during travel. Thus, the platform. 11 makes a bouncing motion, a rolling motion, a pitching motion, and a combined motion within a restricted range.

In the embodiment described above, the third wheel 9 is located on the extension of the centerline CL. Theoretically, however, the third wheel 9 may not be located on the extension of the imaginary centerline CL.

Second Embodiment

Figure 4:
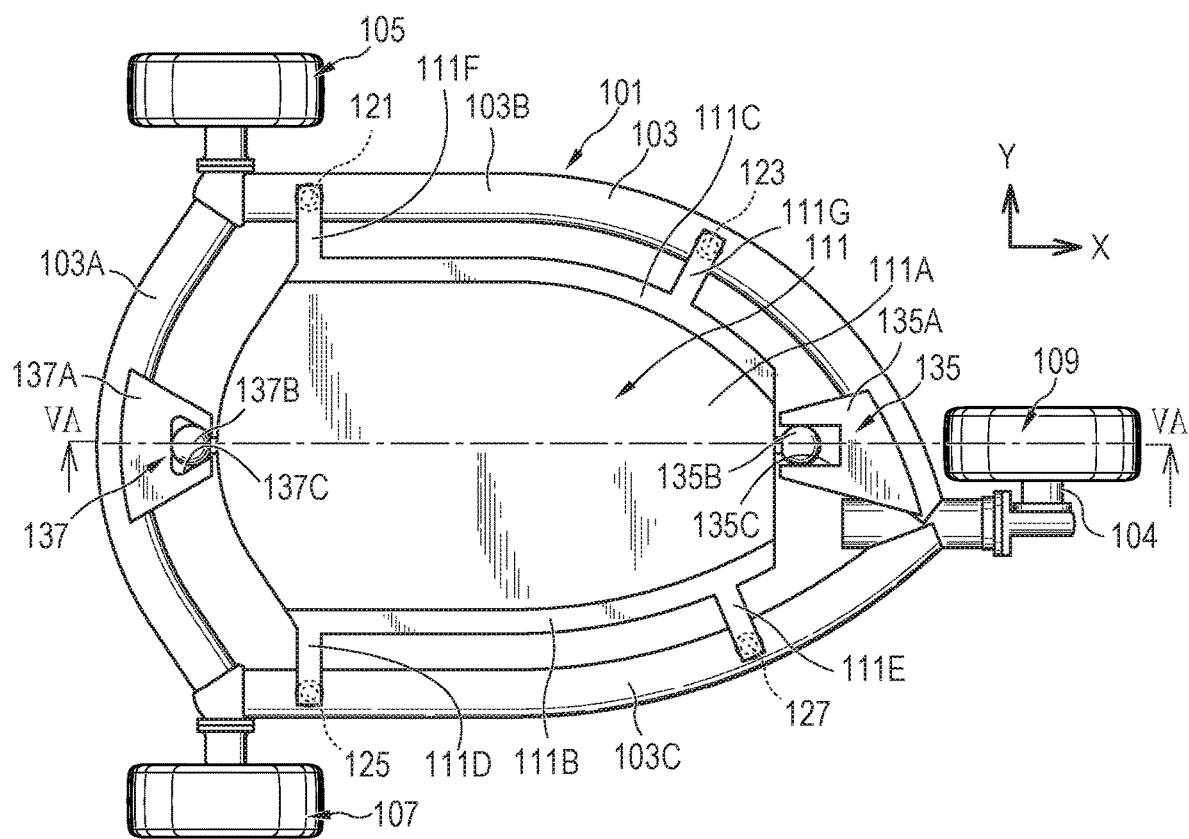
FIG. 4 is a schematic plan view of an essential portion of a three-wheeled vehicle according to a second embodiment of the present invention.
Figure 5:
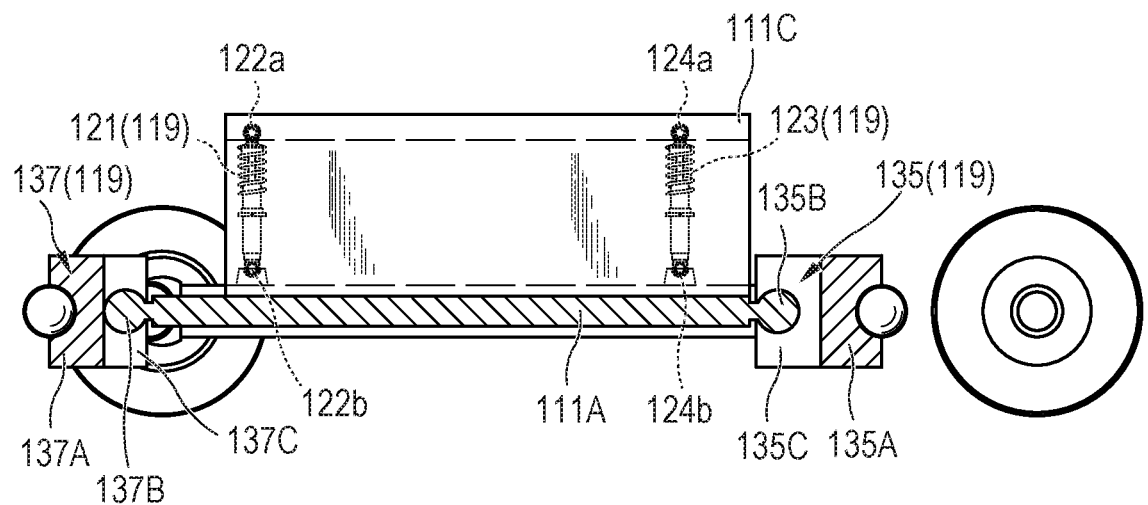
FIG. 5 is a sectional view taken along line A-A of FIG. 4.
Figure 6:
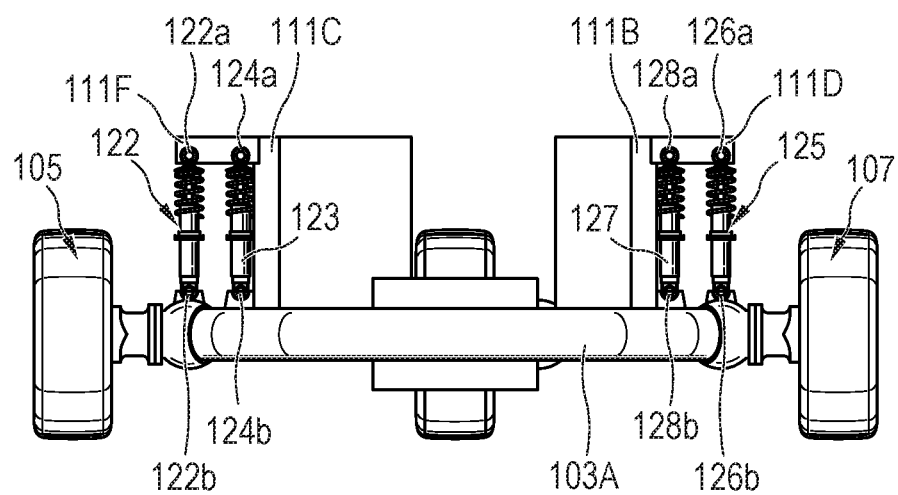
FIG. 6 is a schematic front view of the three-wheeled vehicle according to the second embodiment of the present invention.

FIG. 4 is a schematic plan view of an essential portion of a three-wheeled vehicle according to a second embodiment of the present invention. FIG. 5 is a sectional view taken along the line A-A of FIG. 4. FIG. 6 is a schematic front view of the three-wheeled vehicle according to the second embodiment of the present invention. In the embodiment, the steering mechanism, the power source, the power transfer mechanism, etc. are omitted. Components that are similar to the components in the first embodiment illustrated in FIGS. 1 to 3 are denoted by reference numerals obtained by adding 100 to the reference numerals affixed to their counterparts in the first embodiment. A body frame 103 of a three-wheeled vehicle 101 is the same in configuration as the body frame 3 according to the first embodiment. A platform 111 includes a bottom plate 111A and a pair of side walls 111B and 111C that extend in the Z-axis direction from both ends of the bottom plate 111A in the width direction (Y direction). The upper ends of the pair of side walls 111B and 111C are provided with two arm portions 111D and 111E and 111F and 111G, respectively, that extend in the horizontal direction.

A connecting structure 119 configured to connect the platform 111 and the body frame 103 to each other includes: first and second three degree of freedom non-restricted connecting mechanisms 121 and 123 disposed between a curved pipe 103B of the body frame 103 and the arm portions 111F and 111G of the platform 111; and third and fourth three degree of freedom non-restricted connecting mechanisms 125 and 127 disposed between a curved pipe 103C of the body frame 103 and the arm portions 111D and 111E of the platform 111. The first to fourth three degree of freedom non-restricted connecting mechanisms 121 to 127 may each include a shock absorber. The first end of the shock absorber is connected to the platform 111 via a spherical bearing (122a to 128a). The second end of the shock absorber is connected to the body frame 103 via a spherical bearing (122b to 128b). The shock absorber may be a ready-made product that includes a cylinder and a coil spring for use for suspensions of an automobile.

As illustrated in FIGS. 4 and 5, the connecting structure 119 includes first and second three degree of freedom restricted connecting mechanisms 135 and 137 disposed between curved pipes 103A and 103B of the body frame 103 and the bottom plate 111A of the platform 111. Assume an axis around which the rolling motion is made is defined as an X axis, an axis around which the pitching motion is made is defined as a Y axis, and an axis that is orthogonal to the X axis and the Y axis is defined as a Z axis. The first three degree of freedom restricted connecting mechanism 135 is located on one side in the axial direction of the X axis, and the second three degree of freedom restricted connecting mechanism 137 is located on the other side in the axial direction of the X axis. The first three degree of freedom restricted connecting mechanism 135 is restricted from moving in the axial direction of the Y axis. The second three degree of freedom restricted connecting mechanism 137 is restricted from moving in the axial direction of the X axis and the axial direction of the Y axis. The first three degree of freedom restricted connecting mechanism 135 includes a block 135A fixed to the curved pipe 103B of the body frame 103, and a spherical member 135B fixed to the platform 111. The block 135A is formed with a fitting groove 135C configured to allow the spherical member 135B to slide in the X-axis direction and the Z-axis direction, but to restrict the spherical member 135B sliding in the Y-axis direction. The second three degree of freedom restricted connecting mechanism 137 includes a block 137A fixed to the curved pipe 103A of the body frame 103, and a spherical member 137B fixed to the platform 111. The block 137A is formed with a fitting groove 137C configured to restrict the spherical member 137B sliding in the X-axis direction and the Y-axis direction, but to allow the spherical member 137B to slide only in the Z-axis direction. Specifically, when the amounts of displacement of the first to fourth three degree of freedom non-restricted connecting mechanisms 121 to 127 are the same as each other, the platform 111 makes a bouncing motion. When the amounts of displacement of the third and fourth three degree of freedom non-restricted connecting mechanisms 125 and 127 are different from the amounts of displacement of the first and second three degree of freedom non-restricted connecting mechanisms 121 and 123, the platform 111 makes a rolling motion. When the amounts of displacement of the first and third three degree of freedom non-restricted connecting mechanisms 121 and 125 and the amounts of displacement of the second and fourth three degree of freedom non-restricted connecting mechanisms 123 and 127 are different from each other, the platform 111 makes a pitching motion. When the amounts of displacement of the first to fourth three degree of freedom non-restricted connecting mechanisms 121 to 127 are different from each other, the platform 111 makes a combined motion.

The coil springs of the first to fourth three degree of freedom non-restricted connecting mechanisms 121 to 127 are expanded and contracted as appropriate by a force that acts on the body frame and the platform 111 because of an impact from the road surface and the inertial force during travel. Thus, the platform 111 makes a bouncing motion, a rolling motion, a pitching motion, and a combined motion within a restricted range. Such motions are enabled because the spherical member 135B of the first three degree of freedom restricted connecting mechanism 135, which is disposed between the platform 111 and the body frame 103, operates in the X-axis direction and the Z-axis direction with a motion in the Y-axis direction restricted, and the spherical member 137B of the second three degree of freedom restricted connecting mechanism 137 operates in the Z-axis direction with motions in the X-axis direction and the Y-axis direction restricted, allowing the platform 111 to make a bouncing motion, a rolling motion, a pitching motion, and a combined motion of such motions with respect to the body frame 103, but restricting the platform 111 from making two translational motions other than yawing motion and the bouncing motion with respect to the body frame 103.

Third Embodiment

Figure 7:
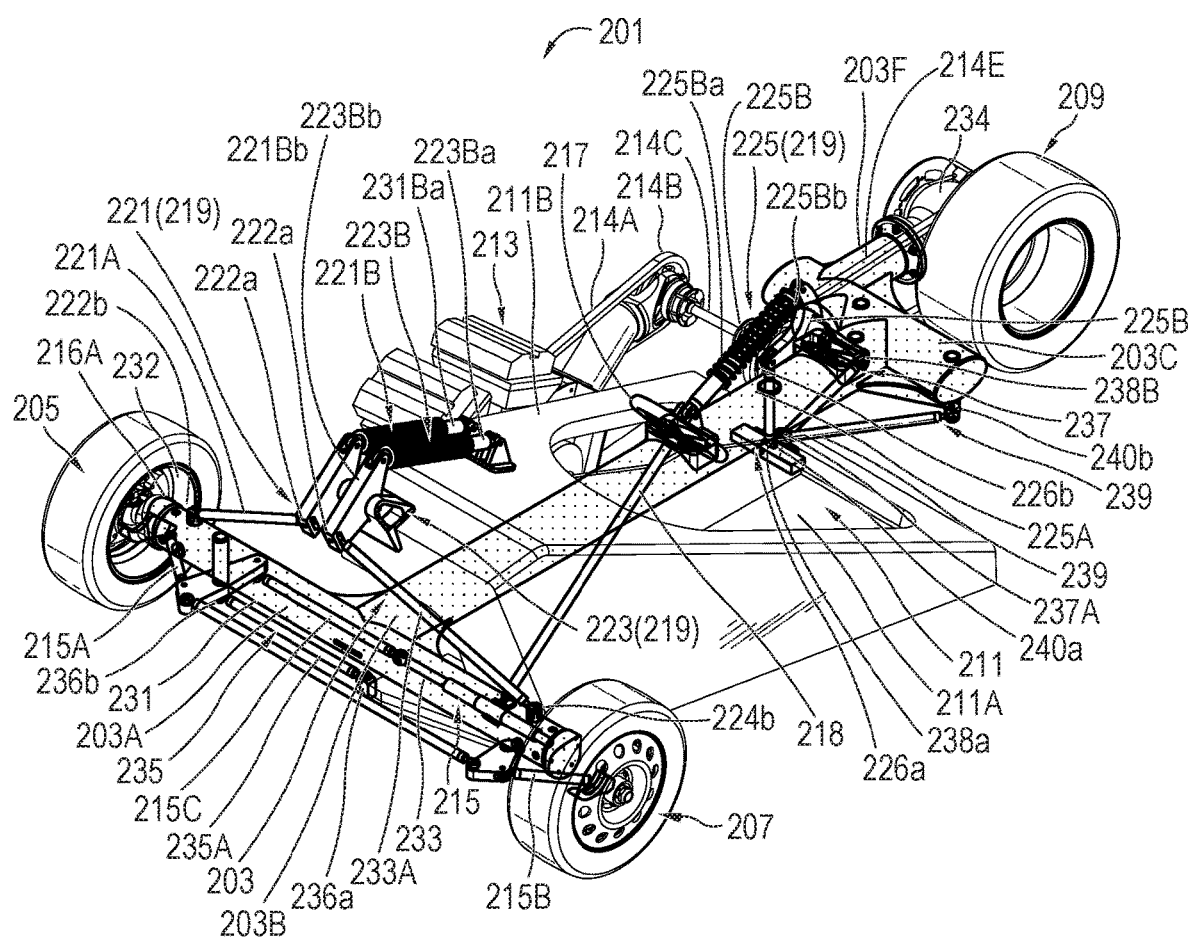
FIG. 7 is a schematic perspective view of a three-wheeled vehicle according to a third embodiment of the present invention as partially visualized.
Figure 8A:
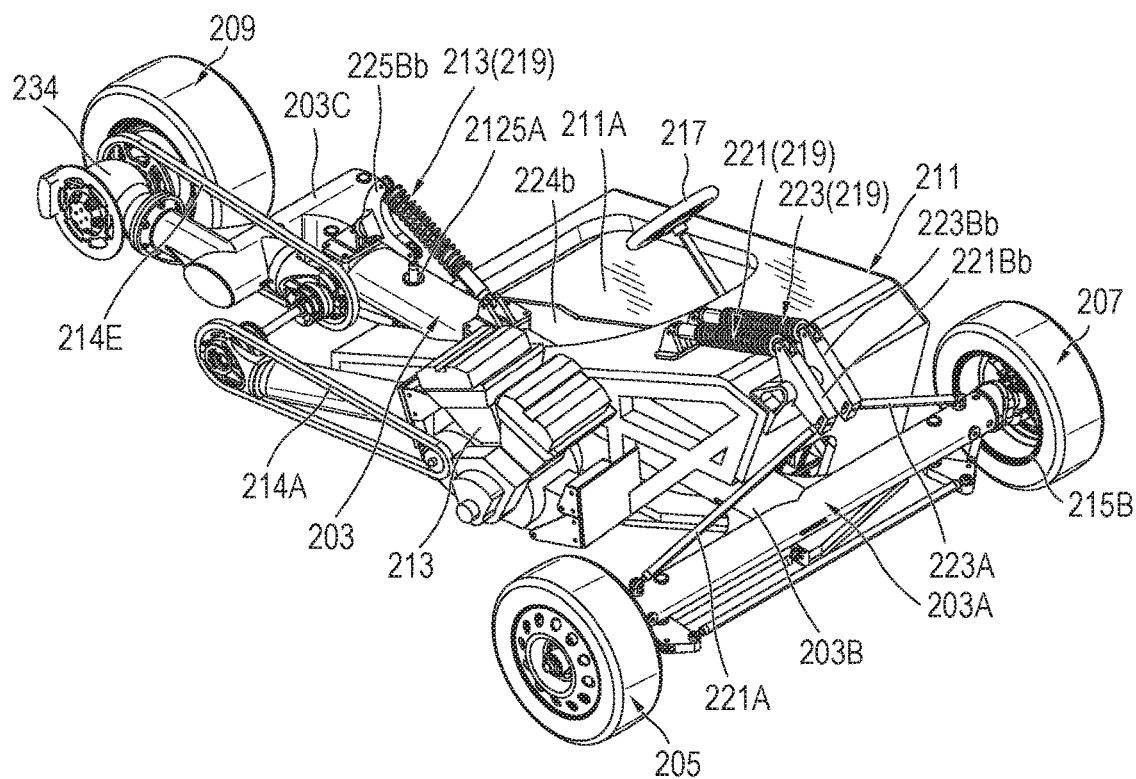
FIGS. 8A to 8C are a perspective view as seen from the left front side, a plan view, and a bottom view, respectively, of the three-wheeled vehicle according to the third embodiment of the present invention.
Figure 8B:
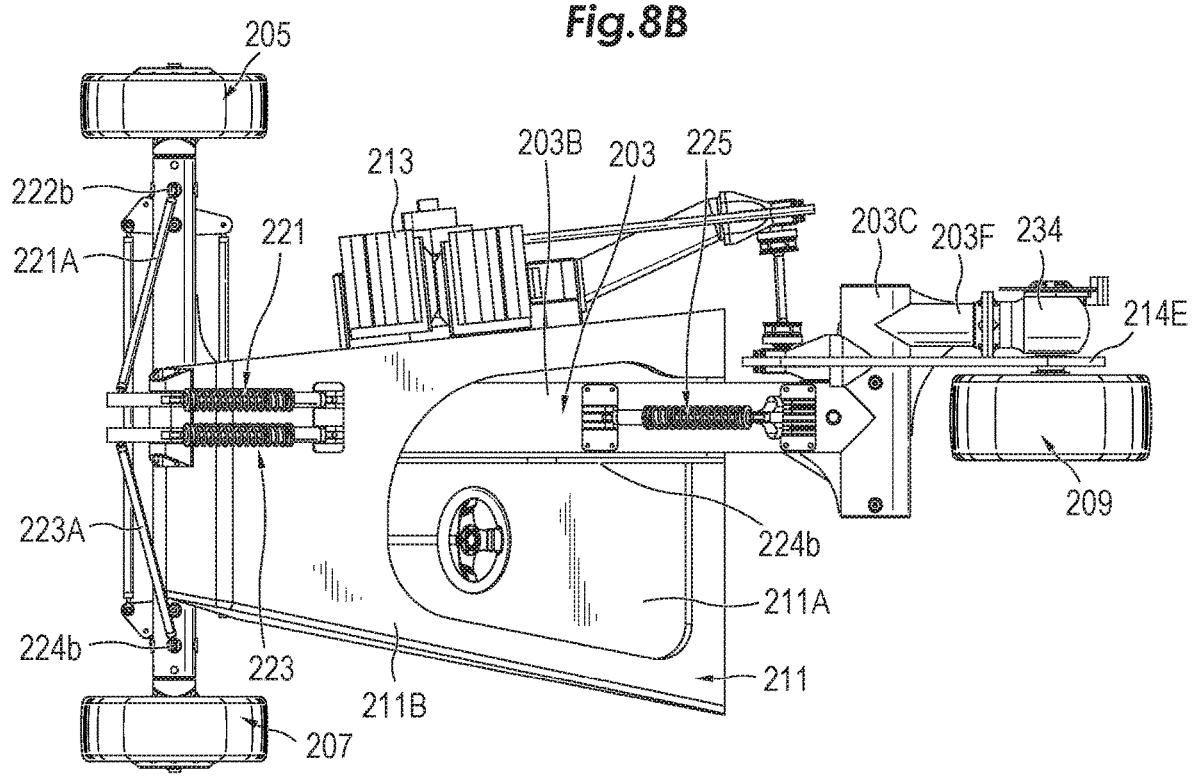
Figure 8C:
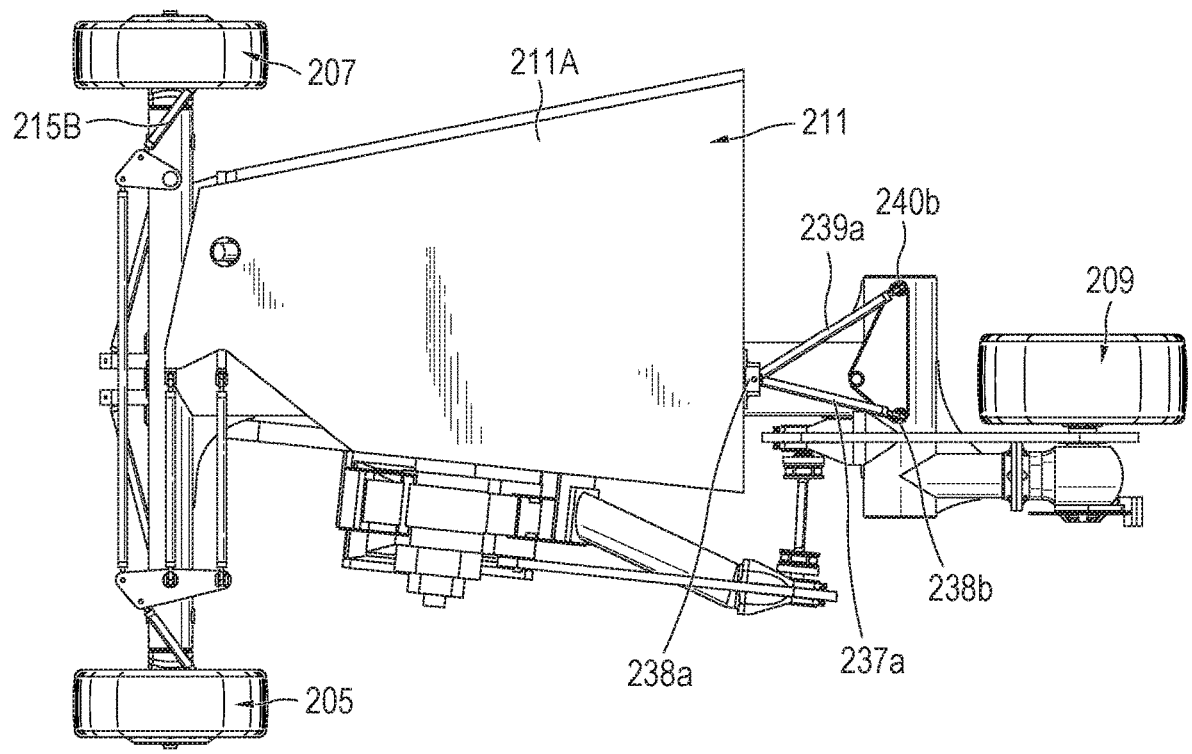
Figure 9A:
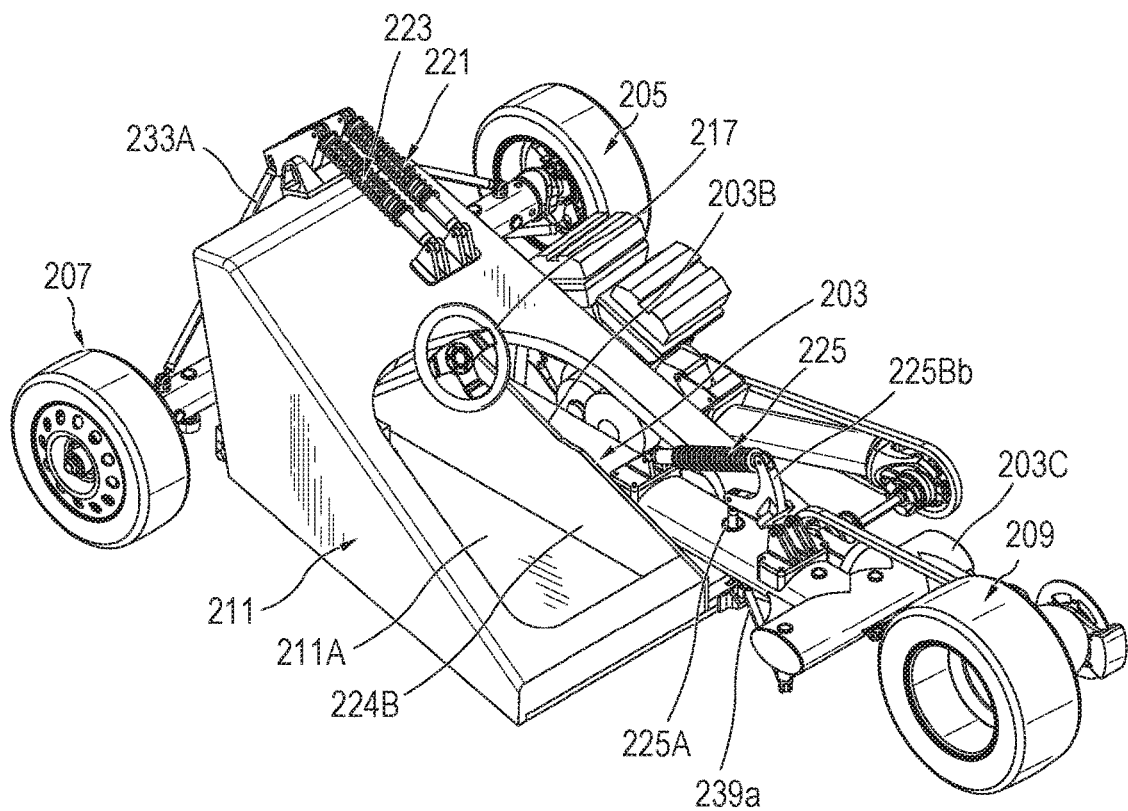
FIGS. 9A to 9C are a perspective view as seen from the left back side, a side view, and a back view, respectively, of the three-wheeled vehicle according to the third embodiment of the present invention.
Figure 9B:
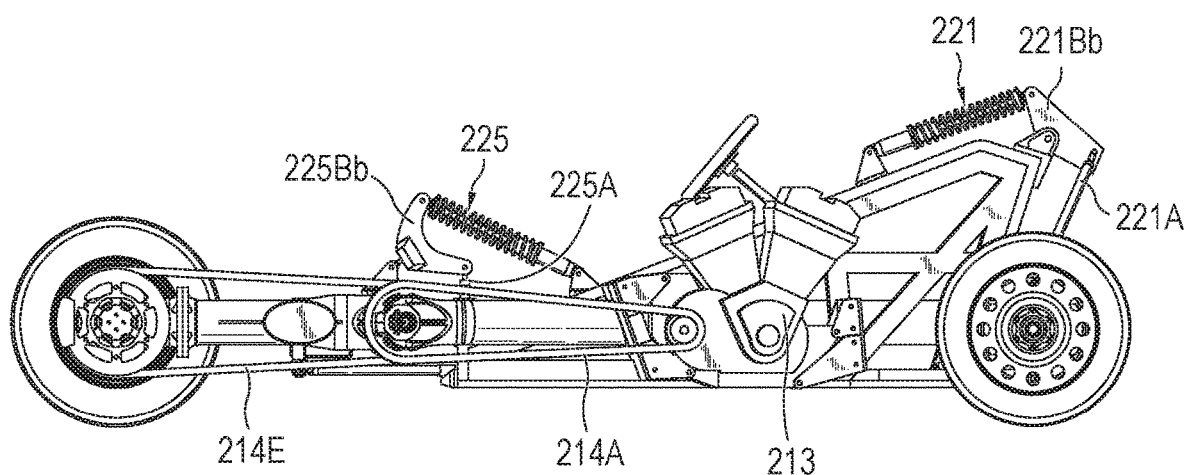
Figure 9C:
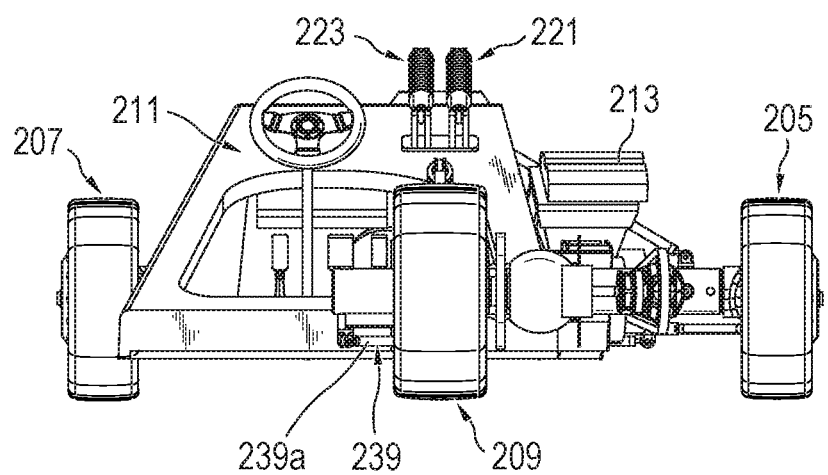

FIGS. 7 to 9 illustrate a three-wheeled vehicle according to a third embodiment of the present invention. In the embodiment, components that function similarly to the components in the first embodiment illustrated in FIGS. 1 to 3 are denoted by reference numerals obtained by adding 200 to the reference numerals affixed to their counterparts in the first embodiment. In the embodiment, a body frame 203 that is rigid includes a center frame 203B, a first frame 203A, and a second frame 203C. The center frame 203B extends along a frame centerline that works as the center of the rolling motion. The first frame 203A is connected to one end of the center frame, and constitutes a portion at the one end. The second frame 203C is connected to the other end of the center frame 203B, and constitutes a portion at the other end. A platform 211 includes a bottom plate 211A and a cover portion 211B. The bottom plate 211A is positioned below the center frame 203B. The cover portion 211B is connected to the bottom plate 211A, and positioned above the center frame 203B on the side of the first frame 203A. In FIG. 7, in order to facilitate understanding, the platform 211 is depicted as partially transparent. Components that complicate the drawings if illustrated, such as a partition wall 224b (FIGS. 8A and 8B), are omitted. The body frame 203 is illustrated as dotted.

In the embodiment, the three or more three degree of freedom non-restricted connecting mechanisms include a first three degree of freedom non-restricted connecting mechanism 221 and a second three degree of freedom non-restricted connecting mechanism 223 that are disposed between the cover portion 211B and both ends of the first frame 203A, and a third three degree of freedom non-restricted connecting mechanism 225 that is disposed between the center frame 203B and the bottom plate 211A.

The two or more three degree of freedom restricted connecting mechanisms include a first three degree of freedom restricted connecting mechanism 235 that is disposed between the first frame 203A of the body frame 203 and the bottom plate 211A of the platform 211, and a second three degree of freedom restricted connecting mechanism 237 and a third three degree of freedom restricted connecting mechanism 239 that are disposed between the second frame 203C of the body frame 203 and the bottom plate 211A.

The first and second three degree of freedom non-restricted connecting mechanisms 221 and 223 include positioning rods 221A and 223A and support mechanisms 221B and 223B, respectively. First ends of the positioning rods 221A and 223A are connected to the support mechanisms 221B and 223B which are provided to the cover portion 211B of the platform 211 via spherical bearings 222a and 224a, respectively, which are ball joints. Second ends of the positioning rods 221A and 223A are connected to the first frame 203A via spherical bearings 222b and 224b, respectively, which are ball joints. The third three degree of freedom non-restricted connecting mechanism 225 includes a positioning rod 225A and a support mechanism 225B. A first end of the positioning rod 225A is connected to the support mechanism 225B via a spherical bearing 226b which is a ball joint. A second end of the positioning rod 225A is connected to the bottom plate 211A of the platform 211 via a spherical bearing 226a which is a ball joint. The positioning rod 225A movably penetrates the center frame 203B. The support mechanism 221B of the first three degree of freedom non-restricted connecting mechanism 221, the support mechanism 223B of the second three degree of freedom non-restricted connecting mechanism 223, and the support mechanism 225B of the third three degree of freedom non-restricted connecting mechanism 225 allow the positioning rods 221A, 223A, and 225A, respectively, to be moved in the vertical direction. Specifically, the support mechanism 221B of the first three degree of freedom non-restricted connecting mechanism 221 and the support mechanism 223B of the second three degree of freedom non-restricted connecting mechanism 223 cause spring members 221Ba and 223Ba to store energy with link mechanisms 221Bb and 223Bb rotated in one direction when the positioning rods 221A and 223A are moved upward with respect to the platform 211, and cause the spring members 221Ba and 223Ba to release energy with the link mechanisms 221Bb and 223Bb rotated in the other direction when the positioning rods 221A and 223A are moved downward with respect to the platform 211. The support mechanism 225B of the third three degree of freedom non-restricted connecting mechanism 225 causes a spring member 225Ba to store energy when a force is applied to move the positioning rod 225A downward with respect to the body frame 203, and causes the spring member 225Ba to release energy when the force is released.

As described above, the support mechanism 221B of the first three degree of freedom non-restricted connecting mechanism 221, the support mechanism 223B of the second three degree of freedom non-restricted connecting mechanism 223, and the support mechanism 225B of the third three degree of freedom non-restricted connecting mechanism 225 include the spring members 221Ba to 225Ba and the link mechanisms 221Bb to 225Bb. The link mechanisms 221Bb to 225Bb are connected to the positioning rods 221A, 223A, and 225A to enable the spring members 221ba to 225Ba to store and release energy. The link mechanisms 221Bb to 225Bb of the support mechanisms 221B to 225B enable the platform 211 to make a bouncing motion, a rolling motion, a pitching motion, and a combined motion of such motions with respect to the body frame 203 within a restricted range, in order to suppress transmission of an impact force, which has been transmitted from the road surface to the body frame 203, to the platform 211 when an impact is applied to the body frame, by allowing displacement of the positioning rods 221A, 223A, and 225A utilizing energy storage and energy release of the spring members 221Ba to 225Ba.

The first to third three degree of freedom restricted connecting mechanisms 235 to 239 are formed substantially similarly to the first to third three degree of freedom restricted connecting mechanisms 35 to 39 according to the first embodiment. The point of connection between the steering rod 215C of the steering mechanism 215 and the operation shaft 218, which is operated using the handle 217, is located on the extension of the steering rod 215C via a gear. In the embodiment, the steering mechanism 215 is configured such that the steering rod 215C of the steering mechanism 215 and the position restricting rod 235A extend in parallel with each other. Also in the embodiment, the first to third three degree of freedom restricted connecting mechanisms 235 to 239 are disposed between the platform 211 and the body frame 203. The first to third three degree of freedom restricted connecting mechanisms 235 to 239 are disposed to allow the platform 211 to make a bouncing motion, a rolling motion, a pitching motion, and a combined motion of such motions with respect to the body frame 203, but to restrict the platform 211 from making two translational motions other than yawing motion and the bouncing motion with respect to the body frame 203.

The structure of the three degree of freedom non-restricted connecting mechanisms and three degree of freedom restricted connecting mechanisms that can be used in the present invention is not limited to the structure adopted in the first to third embodiments described above, and other structures may be employed as a matter of course.

Figure 10A:
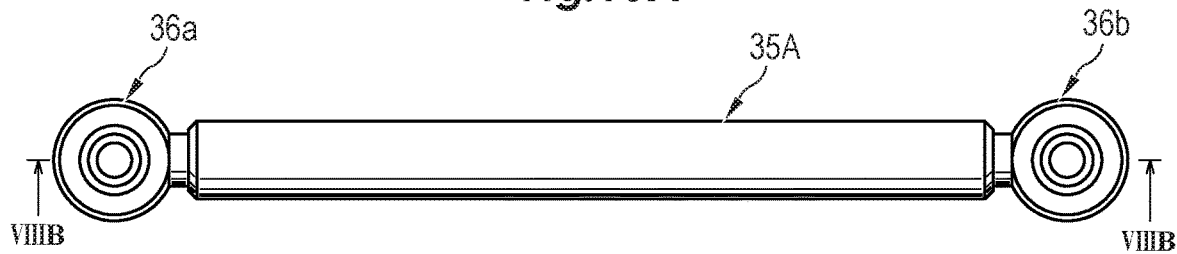
FIG. 10A is a front view of a positioning rod that includes a pair of spherical bearings at both ends.
Figure 10B:
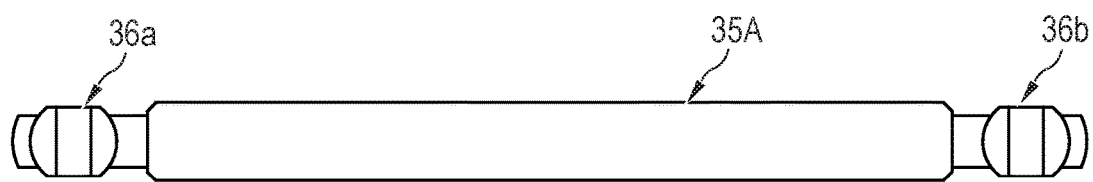
FIG. 10B is a sectional view taken along line A-A of FIG. 10A.
Figure 11A:
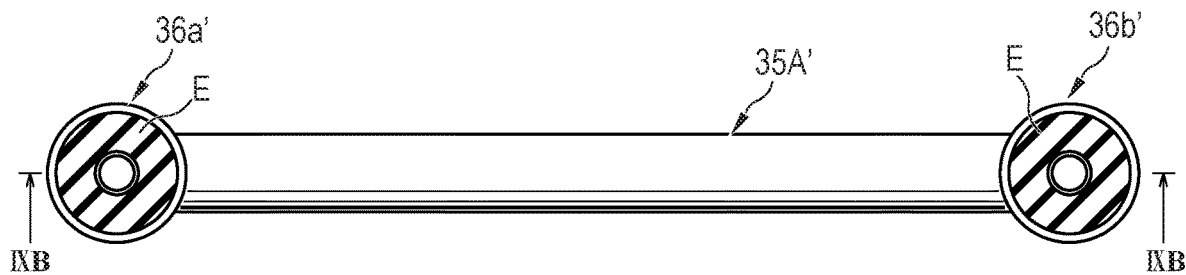
FIG. 11A is a front view of a positioning rod that includes elastic bushings in place of the spherical bearings.
Figure 11B:
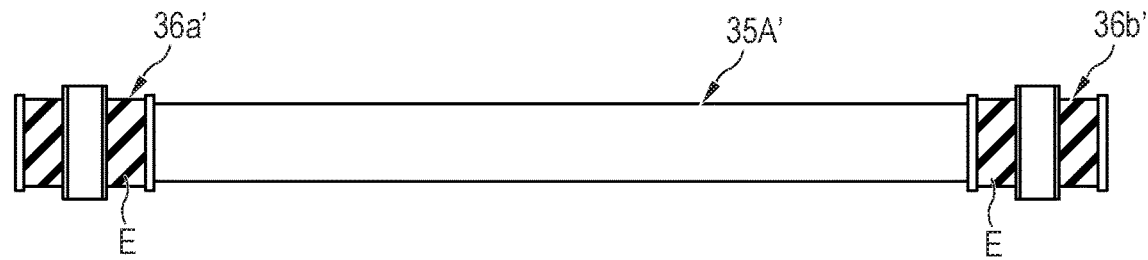
FIG. 11B is a sectional view taken along line B-B of FIG. 11A.

In the embodiments described above, elastic bushings may be used in place of the spherical bearings as a matter of course. An example with such replacement will be described with reference to FIGS. 10A and 10B and FIGS. 11A and 11B. FIG. 10A is a front view of a positioning rod 35A that includes a pair of spherical bearings 36a and 36b at both ends. FIG. 10B is a sectional view taken along line A-A of FIG. 10A. In FIG. 10B, sections are not hatched. FIG. 11A is a front view of a positioning rod 35A' in which elastic bushings 36a' and 36b' are used in place of the spherical bearings 36a and 36b. FIG. 11B is a sectional view taken along line B-B of FIG. 11A. In FIGS. 11A and 11B, elastic members E are hatched. In FIG. 11B, sections are not hatched. The elastic bushings which use the elastic member E locally restrict movement in three axial directions, and do not completely separate the direction of restriction and the direction of freedom from each other, compared to the spherical bearings which allow free rotation only about three axes. However, the elastic bushings can be considered to provide a capability to locally absorb an impact within the range of a motion made by a three-wheeled vehicle during travel, and make a motion that is similar to that of the spherical bearings.

According to the present invention, a so-called rigid-axle system is used for the body frame which is rigid. Thus, the ground contact surfaces of wheels and the road surface can be maintained in contact with each other at all times. The connecting structure allows the platform to make a bouncing motion, a rolling motion, a pitching motion, and a combined motion of such motions with respect to the body frame within a restricted range, in order to suppress transmission of an impact force, which has been transmitted from a road surface to the body frame, to the platform. Thus, most of the impact which has been transmitted from the road surface to the body frame can be absorbed by the connecting structure. As a result, according to the present invention, the riding comfort felt by the driver is not significantly deteriorated.

The present invention is not limited to the embodiments described above, and may be modified and improved without departing from the scope and spirit of the present invention.

What is claimed is:

1. A three-wheeled vehicle comprising:
    a body frame that is rigid and that has a first end and a second end;

first and second wheels provided on both sides of the first end of the body frame and a third wheel provided at the second end of the body frame;

a platform on which a driver rides;

a power source configured to provide power to the first and second wheels or the third wheel; and a steering mechanism configured to steer the first and second wheels or the third wheel; and a connecting structure operable to connect the platform and the body frame to each other, and configured to allow the platform to make a bouncing motion, a rolling motion, a pitching motion, and a combined motion of such motions with respect to the body frame within a restricted range, but to restrict the other motions, in order to suppress transmission of an impact force, which has been transmitted from a road surface to the body frame, to the platform.

2. The three-wheeled vehicle according to claim 1, wherein the connecting structure includes:

three or more three degree of freedom non-restricted connecting mechanisms disposed between the platform and the body frame and around the platform with a clearance from the platform, the three degree of freedom non-restricted connecting mechanisms being configured to support the platform with respect to the body frame and to allow the platform to make the bouncing motion, the rolling motion, the pitching motion, and the combined motion of such motions with respect to the body frame within the restricted range; and two or more three degree of freedom restricted connecting mechanisms disposed between the platform and the body frame, the three degree of freedom restricted connecting mechanisms being configured to allow the platform to make the bouncing motion, the rolling motion, the pitching motion, and the combined motion of such motions with respect to the body frame, but to restrict the platform from making two translational motions other than a yawing motion and the bouncing motion with respect to the body frame.

3. The three-wheeled vehicle according to claim 2, wherein the three degree of freedom non-restricted connecting mechanism includes a positioning rod, a first end of which is connected to the platform via a spherical bearing or an elastic bushing, and a support mechanism connected to a second end of the positioning rod via a spherical bearing or an elastic bushing and attached to the body frame to allow the positioning rod to make a motion in a vertical direction.

4. The three-wheeled vehicle according to claim 2, wherein:

the three degree of freedom restricted connecting mechanism includes three position restricting rods, a first end of each of which is connected to the platform via a spherical bearing or an elastic bushing and a second end of each of which is attached to the body frame via a spherical bearing or an elastic bushing; and one of the position restricting rods extends in parallel with a centerline of the pitching motion in a stationary state and the first end of the one position restricting rod is located on a centerline of the rolling motion, and the two remaining position restricting rods are located on both sides of the centerline of the rolling motion and two centerlines of the two position restricting rods intersect each other at an imaginary point on the centerline of the rolling motion in the stationary state.

5. The three-wheeled vehicle according to claim 2, wherein the three degree of freedom non-restricted connecting mechanism includes a shock absorber, a first end of which is connected to the platform via a spherical bearing or an elastic bushing and a second end of which is connected to the body frame via a spherical bearing or an elastic bushing.

6. The three-wheeled vehicle according to claim 3, wherein:

when an axis around which the rolling motion is made is defined as an X axis, an axis around which the pitching motion is made is defined as a Y axis, and an axis that is orthogonal to the X axis and the Y axis is defined as a Z axis, the two or more three degree of freedom restricted connecting mechanisms include a first three degree of freedom restricted connecting mechanism located on one side in an axial direction of the X axis and a second three degree of freedom restricted connecting mechanism located on the other side in the axial direction of the X axis;

the first three degree of freedom restricted connecting mechanism is restricted from moving in an axial direction of the Y axis; and the second three degree of freedom restricted connecting mechanism is restricted from moving in the axial direction of the X axis and the axial direction of the Y axis.

7. The three-wheeled vehicle according to claim 1, wherein:

the steering mechanism is configured to steer the first wheel and the second wheel; and the power source is provided to drive the third wheel.

8. The three-wheeled vehicle according to claim 2, wherein:

the body frame includes:

a center frame extending along a frame centerline that works as a center of the rolling motion, a first frame connected to one end of the center frame and constituting a portion at the one end, and a second frame connected to the other end of the center frame and constituting a portion at the other end;

the platform includes:

a bottom plate positioned below the center frame, and a cover portion connected to the bottom plate and positioned above the center frame on a side of the first frame;

the three or more three degree of freedom non-restricted connecting mechanisms includes:

a first three degree of freedom non-restricted connecting mechanism and a second three degree of freedom non-restricted connecting mechanism that are disposed between the cover portion and both ends of the first frame, and a third three degree of freedom non-restricted connecting mechanism that is disposed between the center frame and the bottom plate; and the two or more three degree of freedom restricted connecting mechanisms includes:

a first three degree of freedom restricted connecting mechanism that is disposed between the first frame of the body frame and the bottom plate of the platform, and a second three degree of freedom restricted connecting mechanism and a third three degree of freedom restricted connecting mechanism that are disposed between the second frame of the body frame and the bottom plate of the platform.

9. The three-wheeled vehicle according to claim 2, wherein:
   the steering mechanism is configured to steer the first wheel and the second wheel; and
   the power source is provided to drive the third wheel.

10. The three-wheeled vehicle according to claim 3, wherein:
    the steering mechanism is configured to steer the first wheel and the second wheel; and
    the power source is provided to drive the third wheel.

11. The three-wheeled vehicle according to claim 4, wherein:
    the steering mechanism is configured to steer the first wheel and the second wheel; and
    the power source is provided to drive the third wheel.

12. The three-wheeled vehicle according to claim 5, wherein:
    the steering mechanism is configured to steer the first wheel and the second wheel; and
    the power source is provided to drive the third wheel.

13. The three-wheeled vehicle according to claim 6, wherein:
    the steering mechanism is configured to steer the first wheel and the second wheel; and
    the power source is provided to drive the third wheel.

\* \* \* \* \*